United States Patent
Tsai et al.

(10) Patent No.: US 6,562,891 B1
(45) Date of Patent: May 13, 2003

(54) MODIFIED CLAY MINERALS AND POLYMER COMPOSITES COMPRISING THE SAME

(75) Inventors: Tsung-Yen Tsai, Shuang-Shi (TW); Chih Lan Hwang, Hsinchu (TW); Ren-Jye Wu, Hsinchu (TW); Chien-Shiun Liao, Hsinchu (TW); Mao-Song Lee, Hsinchu (JP)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/526,059

(22) Filed: Mar. 15, 2000

(30) Foreign Application Priority Data

Dec. 17, 1999 (TW) .................................. 88122228 A

(51) Int. Cl.⁷ .................................. C08K 3/34
(52) U.S. Cl. ................ 524/445; 524/186; 524/447; 524/449
(58) Field of Search ................ 524/445, 447, 524/449, 186; 501/145, 146, 147, 148

(56) References Cited

U.S. PATENT DOCUMENTS

| | | | |
|---|---|---|---|
| 5,248,720 A | * 9/1993 | Deguchi et al. | ............. 524/444 |
| 5,972,448 A | * 10/1999 | Frisk et al. | ................. 428/35.7 |
| 5,993,769 A | * 11/1999 | Pinnavaia et al. | ........... 423/331 |
| 6,239,195 B1 | * 5/2001 | Suzuki et al. | ................ 523/204 |
| 6,252,020 B1 | * 6/2001 | Kuo et al. | ................... 526/128 |

FOREIGN PATENT DOCUMENTS

| EP | 658576 A1 | * 6/1995 |
|---|---|---|
| GB | 2088882 A | * 6/1982 |
| WO | WO 99/47598 A1 | * 9/1999 |

* cited by examiner

*Primary Examiner*—Edward J. Cain
*Assistant Examiner*—Katarzyna Wyrozebski Lee
(74) *Attorney, Agent, or Firm*—Sughrue Mion, PLLC

(57) ABSTRACT

Disclosed herein is a modified clay mineral comprising a layered clay mineral intercalated with a catalyst that can catalyze a polymerization reaction. Also disclosed herein are a polymer/clay nanocomposite and a method for its manufacture, the polymer/clay nanocomposite comprising a polymer matrix and a layered clay mineral uniformly dispersed in the polymer matrix, the layered clay mineral being intercalated with a catalyst that catalyzes the polymerization of the polymer matrix.

12 Claims, No Drawings

MODIFIED CLAY MINERALS AND POLYMER COMPOSITES COMPRISING THE SAME

BACKGROUND OF THE INVENTION

1. Field of the Invention

The present invention relates in general to the technique of modifying inorganic layered minerals. More particularly, it relates to modified layered clay minerals that are readily exfoliated, polymer/clay composites comprising the modified clay minerals, and a method for its manufacture.

2. Description of the Related Arts

Nanocomposites are a new class of minerals that exhibit ultrafine phase dimensions, typically in the range 1–100 nm. Experimental work on these minerals has generally shown that virtually all types and classes of nanocomposites lead to new and improved properties such as increased stiffness, strength, and heat resistance, and decreased moisture absorption, flammability, and permeability, when compared to their micro- and macrocomposite counterparts. Specifically, commercially available Nylon 6/clay nanocomposite shows that the polymer matrix having layered clay minerals dispersed therein exhibits improved mechanical strength, heat distortion temperature, and impermeability to gas and water.

For the preparation of nanocomposites, it has been disclosed that hydrophilic or hydrophobic swelling agents such as long-chain organic cations, and water-soluble oligomers can be intercalated or absorbed between adjacent silicate layers, to thereby increase the interlayer spacing, so that polymer chains can be included between the silicate layers during polymerization of the polymer matrix. However, the layered silicate according to these methods for the most part can not be exfoliated into individual layers (but can only be swollen), because there is not provided a driving force that can absorb the monomers or oligomers between adjacent silicate layers during the polymerization.

To overcome the above-mentioned problem, the present invention provides a novel method where the layered silicate is intercalated with a catalyst that catalyzes the polymerization of the matrix polymer and thus provides the driving force, such that the silicate layers are readily exfoliated during the polymerization and will be uniformly dispersed in the polymer matrix.

3. Prior Art

There have been numerous attempts to make nanocomposites; see for example; J. Mater. Sci.,31(13), 3589–3596, 1996; Japanese patent Application Laid-Open Nos. 63-215775 and 8-151449; WO 96/35764 and 97/09285; U.S. Pat. Nos. 5,093,439, 5,137,991, 5,164,460, 5,514,734, 5,552,469, 5,578,672, 5,576,257, and 5,616,286. Even though in these methods, layered silicates modified with hydrophilic or hydrophobic agents are more readily exfoliated as compared with non-modified silicates, it is still very difficult to have the silicate layers completely exfoliated and uniformly dispersed in a polymer matrix to give nanoscale structures.

For example, in J. Mater. Sci.,31(13), 3589–3596, 1996, a method is disclosed for making polystyrene nanocomposites wherein montmorillonite which has been surface modified with vinylbenzyltrimethylammonium is mixed with styrene monomer and a suitable organic solvent and then polymerization is effected in the presence of the organic solvent. The interlayer spacing of the montmorillonite contained in the resulting composite is expanded from 0.96 nm to 1.72–2.45 nm. Apparently, the clay minerals could not be exfoliated by soly modified with organic molecules.

WO 96/35764 discloses the reaction of smectite-type clays with certain branched chain quaternary ammonium compounds can produce an organoclay product having superior self-dispersing capability when utilized in grease and ink formulations. The organoclay thus obtained has an interlayer spacing of 2.13–3.23 nm, indicating no exfoliation has taken place.

It should be noted that none of the above cited examples of the related prior art suggest producing nanocomposites from clay minerals that are intercalated with a polymerization catalyst.

SUMMARY OF THE INVENTION

An object of the invention is to provide a modified layered clay mineral that is readily exfoliated when admixed with a matrix polymer during the polymerization of the matrix polymer.

Another object of the invention is to provide a polymer/clay composite comprising the above clay mineral and a method for producing the same.

To attain the above objects, the layered clay mineral according to the invention is intercalated with a polymerization catalyst, and then admixed with monomers or oligomers of a matrix polymer to undergo polymerization, such that the silicate layers can be exfoliated during the polymerization and uniformly dispersed in the polymer matrix.

More specifically, the layered clay mineral is intercalated with a catalyst that catalyzes the polymerization of the matrix polymer and thus provides the driving force of absorbing the monomer or oligomers between adjacent silicate layers during the polymerization. In consequence, the probability of the polymerization to take place between the adjacent silicate layers to thereby break the interlayer bonding is increased. Accordingly, the silicate layers are readily exfoliated and will be dispersed individually and uniformly throughout the polymer matrix. Therefore, the mechanical and other properties can be improved to a considerable extent even if only a small amount of the layered silicate is present.

DETAILED DESCRIPTION OF THE INVENTION

The modified clay mineral of the present invention comprises a layered clay mineral that is intercalated with a polymerization catalyst. In accordance with the present invention, the polymerization catalyst is present in an amount ranging from about 0.05% to 10% by weight, and preferably from about 0.1% to 5% by weight, based on the weight of the layered clay mineral.

The polymer/clay composite of the present invention is prepared by admixing the above-mentioned intercalated clay mineral with monomers or oligomers of a matrix polymer, and polymerizing the monomers or oligomers under the catalysis of the polymerization catalyst. The polymer composite thus prepared comprises a polymer matrix and a layered clay mineral uniformly dispersed therein which is intercalated with the polymerization catalyst. In accordance with the present invention, the intercalated clay mineral is present in an amount ranging from about 0.1% to 30% by weight, and preferably from about 0.5% to 10% by weight, based on the total weight of the polymer composite.

The layered clay mineral used in the present invention is preferably a layered silicate having a cation-exchange capacity ranging from about 7 to 300 meq/100 g. The layered silicate suitable for use herein includes, for example, smectite clay, vermiculite, halloysite, sericite, mica, and the like. Illustrative of suitable smectite clays are montmorillonite, saponite, beidellite, nontronite, and hectorite.

The modified clay mineral of the present invention can be admixed with almost any kind of thermoplastic or thermosetting polymers by way of melt blending or oligomer intercalating, followed by polymerization to form polymer/clay nanocomposites. If necessary, oligomers can be first included between the adjacent silicate layers before subjected to polymerization, which results in a better dispersibility of the exfoliated silicate layers in the polymer matrix. The matrix polymer suitable for use in the present invention includes, for example; conductive polymers such as polyaniline, polypyrrole, polythiphene; polyesters such as polyethylene terephthalate (PET), polybutylene terephthalate (PBT), polycarbonate (PC); silicones such as polydimethyl siloxane, silicone rubber, silicone resin; acrylic resins such as polymethylmethacrylate, polyacrylate; epoxy resins such as bisphenol-epoxy, phenolic-epoxy; and styrene polymers such as polystyrene, styrene-acrylonitrile copolymer, acrylonitrile-butadiene-styrene copolymer.

No particular restrictions are placed on the polymerization catalyst to be used in the invention. They are chosen based on the matrix polymer to be polymerized. The only requirement is that the catalyst must be insensitive to water. The catalyst suitable for use in the present invention includes, for example, antimony acetate that catalyzes the polymerization of PET, 1,8-diazabicyclo[5,4,0] undec-7-ene (DBU) that catalyzes the polymerization of epoxy resins, and cocamidopropylhydroxysultaine that catalyzes the polymerization of polyaniline.

Optionally, the layered clay mineral can be further intercalated with a modifier in addition to the polymerization catalyst. The modifier used herein further expands the interlayer spacing between adjacent silicate layers and to functionalize the clay mineral. The modifier suitable for use in the present invention has a functional group that is reactive with the polymer matrix, including such as carboxyl, hydroxyl, carbonyl, vinyl, sulfonyl, and epoxy groups. Preferably, the modifier is an amido compound. The modifier intercalated at the clay mineral will react to and therefore bond to the polymer matrix to thereby improve mechanical reinforcement, or to increase heat resistance and decrease water permeability. The modifier suitable for use in the present invention includes, for example; commonly used surfactants such as cocamidopropylhydroxysultaine, cocoamphoropionate, and cocoamphoacetate; coupling agents such as glycidyl phthalimide, pentaerythritol polygiycidyl ether, and phenyl glycidyl ether; and compatilizers such as $(MeO)_3Si(CH_2)_3SH$, and $(EtO)_3Si (CH_2)_3NH_2$. In accordance with the present invention, the modifier is present in an amount ranging from about 0.05% to 10% by weight, and preferably from about 0.1% to 5% by weight, based on the weight of the clay mineral.

The polymer/clay composite of the present invention may be further incorporated with additives such as organic or inorganic fillers, antioxidants, UV light absorbers, light stabilizer, antistatic agents, flame retardants, and lubricants according to the intended use.

Without intending to limit it in any manner, the present invention will be further illustrated by the following examples.

EXAMPLE 1

Intercalation of polymerization Catalyst 0.2 g of antimony acetate was dissolved in 10 g of ethylene glycol at 70° C. To the solution, which was kept at 70° C., was added a 80° C. dispersion containing 40 g of montmorillonite powder in 120 g of ethylene glycol, followed by stirring for 4 hours. After this, the mixture was centrifuged, washed with water, dried at 100° C., and ground into powders. X-ray diffraction (XRD) analysis of the powders indicates the interlayer spacing of montmorillonite was increased from 12.6 Å to 17 Å.

Polymerization 2 g of the intercalated montmorillonite was admixed with 3 g of terephthalic acid bis(2-hydroxyethyl) ester (BHET; dimer of PET) by melt blending, and the admixture was =dried and ground into powders. The powders was then admixed with 95 g of BHET and the temperature was raised to 275–280° C. to effect polymerization. XRD analysis of the polymer/clay composite lacked clay (001) reflections. The virtual disappearance of the clay (001) reflections indicates the layer spacing of the montmorillonite layers had a value greater than 44 Å. This was further confirmed using TEM, which indicates the layer spacing was 103 Å.

EXAMPLE 2

Intercalation of Polymerization Catalyst 4 g of DBU (1,8-diazabicyclo[5,4,0]undec-7-ene) was dissolved in 2 L of water at 80° C. To the solution, which was kept at 80° C., was added a dispersion containing 100 g of montmorillonite powder in 2 L of water, followed by stirring for 2 hours. After thorough stirring, the mixture was centrifuged, dried, and pulverized. XRD analysis of the powders indicates the interlayer spacing of montmorillonite was increased from 12.6 Å to 31 Å.

Polymerization 2 g of the intercalated montmorillonite was admixed with 10 g of epoxy resin "YX400OH" (from Taiwan Shell Company) and 80 g of fumed silica, followed by heating at 80° C. for 1 hour. The moisture absorption of the polymer/clay composite thus obtained was decreased by 20% as compared with the counterpart in absence of the clay mineral.

EXAMPLE 3

Intercalation of polymerization Catalyst and Modifier 0.2 g of antimony acetate was dissolved in 10 g of ethylene glycol at 70° C. To the solution, which was kept at 70° C., was added a 80° C. dispersion containing 40 g of montmorillonite powder in 120 g of ethylene glycol. After stirring at 70° C. for 1 hour, a solution containing 50 g of cocoamphopropionate in 80 g of water was added, and left stirring for an additional 3 hours. The resulting mixture was centrifuged, washed with water, dried, and ground into powders. XRD analysis of the powders indicates the interlayer spacing of montmorillonite was increased to 38.4 Å.

Polymerization

The intercalated montmorillonite was admixed with 200 g of BHET in a beaker at room temperature, and then the admixture was transferred into a reactor and stirred. The reactor was sealed under nitrogen and the temperature of the reactor set at 300° C. When the internal temperature of the reactor reached to 210° C., 0.2433 g of 50% $H_3PO_4$ as a stabilizer and 0.0681 g of $Sb_2O_3$ as a catalyst were added. The reactor was purged with some nitrogen, sealed, and left stirring for an additional 20 minutes. Next, the reactor was evacuated to a low vacuum of 0.5–1 torr within about 20 minutes, and then to a high vacuum of about 0.05 torr to effect polymerization. The polymerization was terminated when the inherent visvosity (IV) of the polymer approached to 0.6. XRD analysis of the polymer/clay composite lacked clay (001) reflections. The virtual disappearance of the clay (001) montmorillonite has taken place.

EXAMPLE 4

Intercalation of Polymerization Catalyst/Modifier 700 g of montmorillonite powder was dispersed in 21 kg of water, to which added 300 ml of 1N $H_2SO_4$ with stirring. 786 g of cocamidopropylhydroxysultaine (here used as a catalyst and a modifier) was dissolved in 7800 g of water, to which was added 10 ml of 1N $H_2SO_4$ with stirring. To the solution was added the above prepared dispersion, followed by stirring at 80° C. for 55 minutes. After standing, the precipitated powder was filtered, washed with water and freeze-dried. Thus, a sulfonated montmorillonite was given. XRD analysis of the montmorillonite indicated the interlayer spacing was increased form 12.6 Å to 31 Å.

Polymerization 10 g of the sulfonated montmorillonite was dispersed in 300 ml of xylene and 25 g of aniline. To the dispersion was added a solution containing 87.6 g of dodecylbenzenesulfonic acid (DBSA) in 200 ml of xylene, followed by stirring. Then 100 ml of distilled water was added and an emulsion was formed by through stirring. To the emulsion was added dropwise a solution containing 27.8 g of ammonium persulfate in 100 ml of deionized water over a period of 1 hour. After stirring at 5° C. for an additional 20 hours, the reaction mixture was washed with water and menthol for several times, and concentrated. Thus, a dark green polyaniline/montmorillonite composite was given, which had and electrical conductivity of $2.57 \times 10^{-2}$ S/cm. Thermogravimetric analysis (TGA) reveals that the composite contained 13.26% of the montmorillonite. XRD analysis of the composite indicates delamination of the montmorillonite has taken place.

While the invention had been particularly shown and described with the reference to the preferred embodiment thereof, it will be understood by those skilled in the art the various changes in form and details may be without departing from the spirit and scope of the invention.

What is claimed is:

1. A method for producing a polymer/clay composite comprising a polymer matrix selected from the group consisting of polyethylene terephthalate (PET), epoxy resins and polyaniline and a layered clay mineral uniformly dispersed in said polymer matrix, said method comprising the steps of:
    (a) intercalating a layered clay mineral with a polymerization catalyst in a polar solvent selected from the group consisting of ethylene glycol and water;
    (b) admixing the intercalated clay mineral with monomers or oligomers of said polymer matrix; and
    (c) polymerizing said monomers or oligomers under the catalysis of said polymerization catalyst.

2. The method as claimed in claim 1, wherein said polymer matrix is selected from the group consisting of thermoplastic polymers, thermosetting polymers, and combinations thereof.

3. The method as claimed in claim 1, wherein said polymer matrix is selected from the group consisting of conductive polymers, acrylic resins, silicones, rubbers, epoxy resins, and styrene polymers.

4. The method as claimed in claim 1, wherein said layered clay mineral is present in an amount ranging from about 0.1% to 30% by weight based on the total weight of the polymer composite.

5. The method as claimed in claim 1, wherein said catalyst is present in an amount ranging from about 0.05% to 10% by weight based on the weight of the layered clay mineral.

6. The method as claimed in claim 1, wherein step (a) further comprises the step of:
    intercalating the layered clay mineral with a modifier containing a reactive functional group.

7. The method as claimed in claim 6, wherein said modifier is present in an amount ranging from about 0.05% to 10% by weight based on the weight of the layered clay mineral.

8. The method as claimed in claim 6, wherein said modifier is selected from the group consisting of surfactants, coupling agents, and compatilizers.

9. The method as claimed in claim 6, wherein said modifier is an amido compound containing a functional group selected from the group consisting of carboxyl, hydroxyl, carbonyl, vinyl, sulfonyl, and epoxy groups.

10. The method as claimed in claim 1, wherein said layered clay mineral is selected from the group consisting of smectite clay, vermiculite, halloysite, sericite, and mica.

11. The method as claimed in claim 10, wherein said layered clay mineral is a smectite clay selected from the group consisting of montmorillonite, saponite, beidellite, nontronite and hectorite.

12. The method as claimed in claim 1, wherein said layered clay mineral has a cation-exchange capacity ranging from about 7 to 300 meq/100 g.

* * * * *

UNITED STATES PATENT AND TRADEMARK OFFICE
CERTIFICATE OF CORRECTION

| | | |
|---|---|---|
| PATENT NO. | : 6,562,891 B1 | Page 1 of 1 |
| DATED | : May 13, 2003 | |
| INVENTOR(S) | : Tsung-Yen Tsai et al. | |

It is certified that error appears in the above-identified patent and that said Letters Patent is hereby corrected as shown below:

<u>Title page,</u>
Item [75], Inventors, please change the nationality of "Mao-Song Lee" from "JP" to -- TW --.
Item [73], Assignee, please insert the second assignee, namely -- Pai Kong Ceramic Materials Co., Ltd., Taoyuan (TW) --.

Signed and Sealed this

Sixteenth Day of December, 2003

JAMES E. ROGAN
*Director of the United States Patent and Trademark Office*